(12) United States Patent
Dowdy et al.

(10) Patent No.: US 7,895,661 B2
(45) Date of Patent: Feb. 22, 2011

(54) METHOD AND SYSTEM FOR SECURE NETWORK-BASED DISTRIBUTION OF CONTENT

(75) Inventors: Thomas Dowdy, Sunnyvale, CA (US);
Jeffrey L. Robbin, Los Altos, CA (US);
Guy L. Tribble, Hillsborough, CA (US);
David Heller, San Jose, CA (US)

(73) Assignee: Apple Inc., Cupertino, CA (US)

( * ) Notice: Subject to any disclaimer, the term of this patent is extended or adjusted under 35 U.S.C. 154(b) by 2003 days.

(21) Appl. No.: 10/832,812

(22) Filed: Apr. 26, 2004

(65) Prior Publication Data

US 2005/0050345 A1 Mar. 3, 2005

Related U.S. Application Data

(63) Continuation-in-part of application No. 10/423,700, filed on Apr. 25, 2003, now abandoned.

(51) Int. Cl.
*G06F 12/14* (2006.01)
*G06F 21/00* (2006.01)
*H04L 9/00* (2006.01)

(52) U.S. Cl. .............................. 726/27; 726/31; 726/32; 713/193; 380/28; 380/44; 705/53; 705/54; 705/57

(58) Field of Classification Search ........................ None
See application file for complete search history.

(56) References Cited

U.S. PATENT DOCUMENTS

| 5,963,915 A | 10/1999 | Kirsch |
| 5,963,916 A | 10/1999 | Kaplan |
| 6,226,618 B1 | 5/2001 | Downs et al. |
| 6,233,682 B1 | 5/2001 | Fritsch |
| 6,385,596 B1 | 5/2002 | Ansell et al. |
| 6,587,837 B1 * | 7/2003 | Spagna et al. ................. 705/26 |

(Continued)

FOREIGN PATENT DOCUMENTS

EP 0927945 7/1999

(Continued)

OTHER PUBLICATIONS

Notice of Preliminary Rejection for Korean Patent Application 10-2007-7005851 (with translation), Korean Patent Office, dated Nov. 19, 2007.

(Continued)

*Primary Examiner*—Kaveh Abrishamkar (57) ABSTRACT

A method and system for network-based distribution of content are disclosed. The distribution of content is not only secure but also controlled. The security restricts access to content within media files during downloads as well as while stored at a server or client. In one embodiment, each media file is encrypted with a different, randomly generated key. The control over the distribution of the media file can serve to limit the subsequent distribution of media files from clients to other clients. In another embodiment, the control can permit media files to be shared on a limited number of different clients affiliated with the same user. The clients can vary with application but generally are computing devices that have memory storage. Often, the clients are personal computers or other computing devices that are capable of storing and presenting content to their users.

32 Claims, 10 Drawing Sheets

U.S. PATENT DOCUMENTS

| | | | |
|---|---|---|---|
| 6,731,312 | B2 | 5/2004 | Robbin |
| 7,239,709 | B1 | 7/2007 | Yamada et al. |
| 2001/0039659 | A1 | 11/2001 | Simmons et al. |
| 2001/0044786 | A1 | 11/2001 | Ishibashi |
| 2002/0002468 | A1 | 1/2002 | Geisler et al. |
| 2002/0042730 | A1 | 4/2002 | Homer |
| 2003/0079120 | A1 | 4/2003 | Hearn et al. |
| 2004/0236957 | A1 | 11/2004 | Durand et al. |
| 2004/0268451 | A1 | 12/2004 | Robbin et al. |
| 2005/0021478 | A1 | 1/2005 | Gautier et al. |
| 2005/0050345 | A1 | 3/2005 | Dowdy et al. |

FOREIGN PATENT DOCUMENTS

| | | |
|---|---|---|
| EP | 1 883 031 A3 | 3/2008 |
| FR | 2827981 | 1/2003 |
| JP | 11/161717 A | 6/1999 |
| JP | 2001-5877 | 1/2001 |
| JP | 2003-73051 | 3/2002 |
| JP | 2002/99466 | 4/2002 |
| JP | 2003-50745 | 2/2003 |
| KR | 2001-5654 | 1/2001 |
| WO | WO 00/31744 | 6/2000 |
| WO | WO 00/043905 | 7/2000 |
| WO | 00/62265 | 10/2000 |
| WO | 01/41023 | 6/2001 |
| WO | 01/44908 | 6/2001 |
| WO | 01/46786 | 6/2001 |
| WO | WO 0146786 | 6/2001 |
| WO | WO 02/01330 | 1/2002 |
| WO | WO 03/017213 | 2/2003 |

OTHER PUBLICATIONS

Notice of Preliminary Rejection for Korean Patent Application 10-2007-7005850 (with translation), Korean Patent Office, dated Nov. 19, 2007.
International Search Report for PCT/US2004/012848, mailed Oct. 20, 2004.
International Preliminary Report on Patentability for PCT/US2004/012848, issued Oct. 28, 2005.
The Examiner's Grounds for Rejection for Korean Patent Application No. 10-2007-7005850 (with translation), Korean Patent Office, dated May 15, 2008.
European Search Report for Application No. 07075884.2, European Patent Office, dated Feb. 4, 2008.
Notice of Final Rejection for Korean Patent Application No. 10-2007-7005851 (with translation), Korean Patent Office, dated May 15, 2008.
Communication pursuant to Article 96(2) EPC for corresponding EP Application No. 04 750 679.5 dated Sep. 11, 2007.
Communication pursuant to Article 96(2) EPC for corresponding EP Application No. 04 750 679.5 dated Apr. 27, 2006.
Communication pursuant to Article 94(3) EPC for corresponding EP Application No. 07 075 884.2 dated Nov. 28, 2008.
Notification of Reason for Rejection for Japanese Patent Application No. 2006-513343 mailed Jul. 14, 2009.
Notice of Preliminary Rejection (Non-Final) for Korean Patent Application No. 10-2009-7024104 dated Feb. 26, 2010 (with translation).
Notice of Final Rejection for Korean Patent Application No. 10-2007-7005847(with translation), Korean Patent Office, dated Feb. 26, 2010 (with translation).
Notice of Final Rejection for Korean Patent Application No. 10-2007-7005847(with translation), Korean Patent Office, dated Jun. 15, 2010 (with translation).
Communication pursuant to Article 94(3) EPC for corresponding EP Application No. 07 075 884.2 dated Apr. 26, 2010.
European Search Report for Application No. 09168616.2, European Patent Office, dated Jul. 30, 2010.
Notice of Preliminary Rejection for Korean Patent Application No. 10/2010-7018168 (with translation), Korean Patent Office, dated Oct. 18, 2010.
Notice of Preliminary Rejection for Korean Patent Application No. 10-2009-7024104 (with translation), Korean Patent Office, dated Oct. 18, 2010.
Notification of Reason for Rejection for Japanese Patent Application No. 2006-513343 (with translation), dated Sep. 28, 2010.

\* cited by examiner

METHOD AND SYSTEM FOR SECURE NETWORK-BASED DISTRIBUTION OF CONTENT

CROSS-REFERENCE TO RELATED APPLICATIONS

This application is a Continuation-In-Part of U.S. patent application Ser. No. 10/423,700, filed Apr. 25, 2003 now abandoned, and entitled "METHOD AND SYSTEM FOR SECURE NETWORK-BASED DISTRIBUTION OF CONTENT", which is hereby incorporated by reference herein.

This application is also related to: (i) U.S. patent application Ser. No. 10/833,267, filed concurrently, and entitled "METHOD AND SYSTEM FOR NETWORK-BASED PURCHASE AND DISTRIBUTION OF MEDIA", which is hereby incorporated by reference herein; and (ii) U.S. patent application Ser. No. 10/832,984, filed concurrently, and entitled "GRAPHICAL USER INTERFACE FOR BROWSING, SEARCHING AND PRESENTING MEDIA ITEMS", which is hereby incorporated by reference herein.

BACKGROUND OF THE INVENTION

1. Field of the Invention

The present invention relates to content distribution and, more particularly, to content distribution in a client-server environment.

2. Description of the Related Art

In recent years music delivery or distribution over the Internet has become popular. Due to the advances in efficient file formats, such as MP3 and MPEG4, the size of media files have become small enough to make their download via the Internet practical. Also, technological advances have led to higher-speed Internet connections and lower cost of memory. The combination of these advances make downloading media files, such as for music and videos, manageable and not too time consuming.

One popular approach to music distribution is mp3.com which uses a centralized server for storage of the numerous songs that are available for download. Another popular approach to music distribution was Napster in which peer-to-peer sharing was utilized. With peer-to-peer sharing, the numerous songs reside on the user machines of the many users, not on a centralized server.

These on-line approaches to music distribution were associated with wide-scale copyright infractions. The music industry was particularly concerned over the popularity of these on-line music distribution websites and the associated unauthorized copying and sharing of media files. In an effort to protect its copyrights and royalty revenue for artists, the music industry undertook legal actions to thwart these popular on-line music distribution websites.

Thus, there is a need for improved approaches to on-line content distribution that provides users the ease and convenience of downloading media files, while at the same time provides a secured and controlled environment to protect copyright holders' rights to the content contained within the media files.

SUMMARY OF THE INVENTION

Broadly speaking, the invention relates to network-based distribution of content. The distribution of content is not only secure but also controlled. The security restricts access to content within media files during downloads as well as while stored at a server or client. In one embodiment, each media file is encrypted with a different, randomly generated key. The control over the distribution of the media file can serve to limit the subsequent distribution of media files from clients to other clients. In another embodiment, the control can permit media files to be shared on a limited number of different clients affiliated with the same user. The clients can vary with application but generally are computing devices that have memory storage. Often, the clients are personal computers or other computing devices that are capable of storing and presenting content to their users.

The invention can be implemented in numerous ways including, as a method, system, device, apparatus, or computer readable medium. Several embodiments of the invention are discussed below.

As a method for storing media files to a centralized media storage such that they are ready for download, one embodiment of the invention includes at least the operations of: receiving media files pertaining to media items, each of the media files having at least media content data; generating a download key for each of the media files, the download keys being different for each of the media files; encrypting each of the media files with the corresponding one of the download keys to produce encrypted media files; and storing the encrypted media files to the centralized media store.

As a method for acquiring a media file for usage at a local machine from a central server machine, one embodiment of the invention includes at least the operations of: identifying a media file from a plurality of available media files, each of the media files having at least media content data; purchasing access to the identified media file; obtaining a download key that corresponds to the identified media file; downloading the identified media file in its encrypted form to the local machine; decrypting the identified media file to its unencrypted form using the download key; obtaining at least one user key, the user key being associated with a user of the local machine; generating a content key that is at least substantially random; encrypting the media content data of the identified media file with the content key; encrypting the content key with the user key to produce an encrypted content key; modifying the identified media file to further include a user key reference and the encrypted content key; and storing the modified media file to the local machine.

As a method for acquiring a media file for usage at a local machine from a central server machine, another embodiment of the invention includes at least the operations of: identifying a media file from a plurality of available media files, each of the media files having at least media content data; purchasing access to the identified media file; obtaining a download key that corresponds to the identified media file; downloading the identified media file in its encrypted form to the local machine; obtaining at least one user key, the user key being associated with a user of the local machine; generating a content key that is at least substantially random; transcrypting the media content data of the identified media file using the download key and the content key; encrypting the content key with the user key to produce an encrypted content key; modifying the identified media file to further include a user key reference and the encrypted content key; and storing the modified media file to the local machine.

As a method for acquiring a media file for usage at a local machine from a central server machine, still another embodiment of the invention includes at least the operations of: identifying a media file from a plurality of available media files, each of the media files having at least media content data; purchasing access to the identified media file; obtaining at least one user key, the user key being associated with a user of the local machine; generating a content key that is at least substantially random; encrypting the media content data of the identified media file with the content key; encrypting the content key with the user key to produce an encrypted content key; and modifying the identified media file to further include a user key reference and the encrypted content key.

As a method for presenting content data from a media file to a user, one embodiment of the invention includes at least the operations of: identifying a media file to be presented, the identified media file having at least encrypted media content data, a user key reference, and an encrypted content key; obtaining a user key based on the user key reference within the identified media file; obtaining the encrypted content key from the identified media file; decrypting the encrypted content key using the user key to obtain the content key; decrypting the encrypted media content data of the identified media file with the content key; and presenting the media content data of the identified media file.

As a computer readable medium including at least computer program code for storing media files to a centralized media store associated with a central server machine, as well as acquiring a media file for usage at a local machine from the central server machine, one embodiment of the invention includes at least: computer program code for receiving media files pertaining to media items, each of the media files having at least media content data; computer program code for generating a download key for each of the media files, the download keys being different for each of the media files; computer program code for encrypting each of the media files with the corresponding one of the download keys to produce encrypted media files; computer program code for storing the encrypted media files to the centralized media store; computer program code for identifying a media file to be purchased from a plurality of available media files, each of the media files having at least media content data; computer program code for purchasing access to the identified media file; computer program code for obtaining a download key that corresponds to the identified media file; and computer program code for downloading the identified media file in its encrypted form to the local machine.

As a computer readable medium including at least computer program code for acquiring a media file for usage at a local machine from a central server machine, one embodiment of the invention includes at least: computer program code for receiving a particular media file at the local machine from the server machine, the particular media file having at least media content data; computer program code for decrypting the particular media file to its unencrypted form using the download key; computer program code for obtaining at least one user key, the user key being associated with a user of the local machine; computer program code for generating a content key that is at least substantially random; computer program code for encrypting the media content data of the particular media file with the content key; computer program code for encrypting the content key with the user key to produce an encrypted content key; computer program code for modifying the particular media file to further include a user key reference and the encrypted content key; and computer program code for storing the modified media file to the local machine.

As computer readable medium including at least computer program code for usage of a media file at a local machine from a central server machine, one embodiment of the invention includes at least: computer program code for identifying a media file from a plurality of available media files, each of the media files having at least media content data; computer program code for purchasing access to the identified media file; computer program code for obtaining a download key that corresponds to the identified media file; computer program code for downloading the identified media file in its encrypted form to the local machine; computer program code for obtaining at least one user key, the user key being associated with a user of the local machine; computer program code for generating a content key that is at least substantially random; computer program code for transcrypting the media content data of the identified media file using the download key and the content key; computer program code for encrypting the content key with the user key to produce an encrypted content key; computer program code for modifying the identified media file to further include a user key reference and the encrypted content key; and computer program code for storing the modified media file to the local machine.

As a computer readable medium including at least computer program code for acquiring a media file for usage at a local machine from a central server machine, one embodiment of the invention includes at least: computer program code for identifying a media file from a plurality of available media files, each of the media files having at least media content data; computer program code for purchasing access to the identified media file; computer program code for obtaining at least one user key, where the user key is associated with a user of the local machine; computer program code for generating a content key that is at least substantially random; computer program code for encrypting the media content data of the identified media file with the content key; computer program code for encrypting the content key with the user key to produce an encrypted content key; and computer program code for modifying the identified media file to further include a user key reference and the encrypted content key.

As a media distribution system, one embodiment of the invention includes at least a media store and a media server. The media store stores a plurality of media files, where each of the media files have at least media content data and possibly metadata. The metadata, if provided, describes characteristics of the associated media item. The media server operates to generate a download key for each of the media files to be stored, to encrypt each of the media files with the corresponding one of the download keys to produce encrypted media files, and to store the encrypted media files to the media store.

As a media distribution system, another embodiment of the invention includes at least a media store and a media server. The media store stores a plurality of media files, where each of the media files have at least encrypted media content data. The media server operates to distribute the media files to machines in a secure manner such that the media files can be presented on only those user machines that have been authorized by user accounts maintained by said media server.

Another embodiment of the invention concerns a media distribution system wherein a set of the media files that have been purchased by a particular user can be authorized for use on a limited number of machines associated with the particular user.

As a computer readable medium including at least computer program code for presenting a media file at a local machine, one embodiment of the invention includes at least: computer program code for identifying a media file to be presented, the identified media file having at least encrypted media content data, a user key reference, and an encrypted content key; computer program code for obtaining a user key based on the user key reference within the identified media file; computer program code for obtaining the encrypted content key from the identified media file; computer program code for decrypting the encrypted content key using the user key to obtain the content key; computer program code for decrypting the encrypted media content data of the identified media file with the content key; and computer program code for presenting the media content data of the identified media file.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to network-based distribution of content. The distribution of content is not only secure but also controlled. The security restricts access to content within media files during downloads as well as while stored at a server or client. In one embodiment, each media file is encrypted with a different, randomly generated key. The control over the distribution of the media file can serve to limit the subsequent distribution of media files from clients to other clients. In another embodiment, the control can permit media files to be shared on a limited number of different clients affiliated with the same user. The clients can vary with application but generally are computing devices that have memory storage. Often, the clients are personal computers or other computing devices that are capable of storing and presenting content to their users.

The invention pertains to a method and system for controlled distribution of content in a client-server environment. The controlled distribution uses encryption and user accounts to not only restrict unauthorized access to the content but also to limit usage rights to the content by authorized users.

The content can, for example, be audio, video, or image data. The content can also be referred to as media content or media (when referring to audio, video, or image data). The content is typically contained in a file known as a media file. Such media files have a digital form and are stored on a data storage medium. For example, the data storage medium can pertain to a compact disc, a magnetic storage device, a semiconductor memory device, an optical storage device, etc.

Embodiments of this aspect of the invention are discussed below with reference to FIGS. 1-7. However, those skilled in the art will readily appreciate that the detailed description given herein with respect to these figures is for explanatory purposes as the invention extends beyond these limited embodiments.

Figure 1:
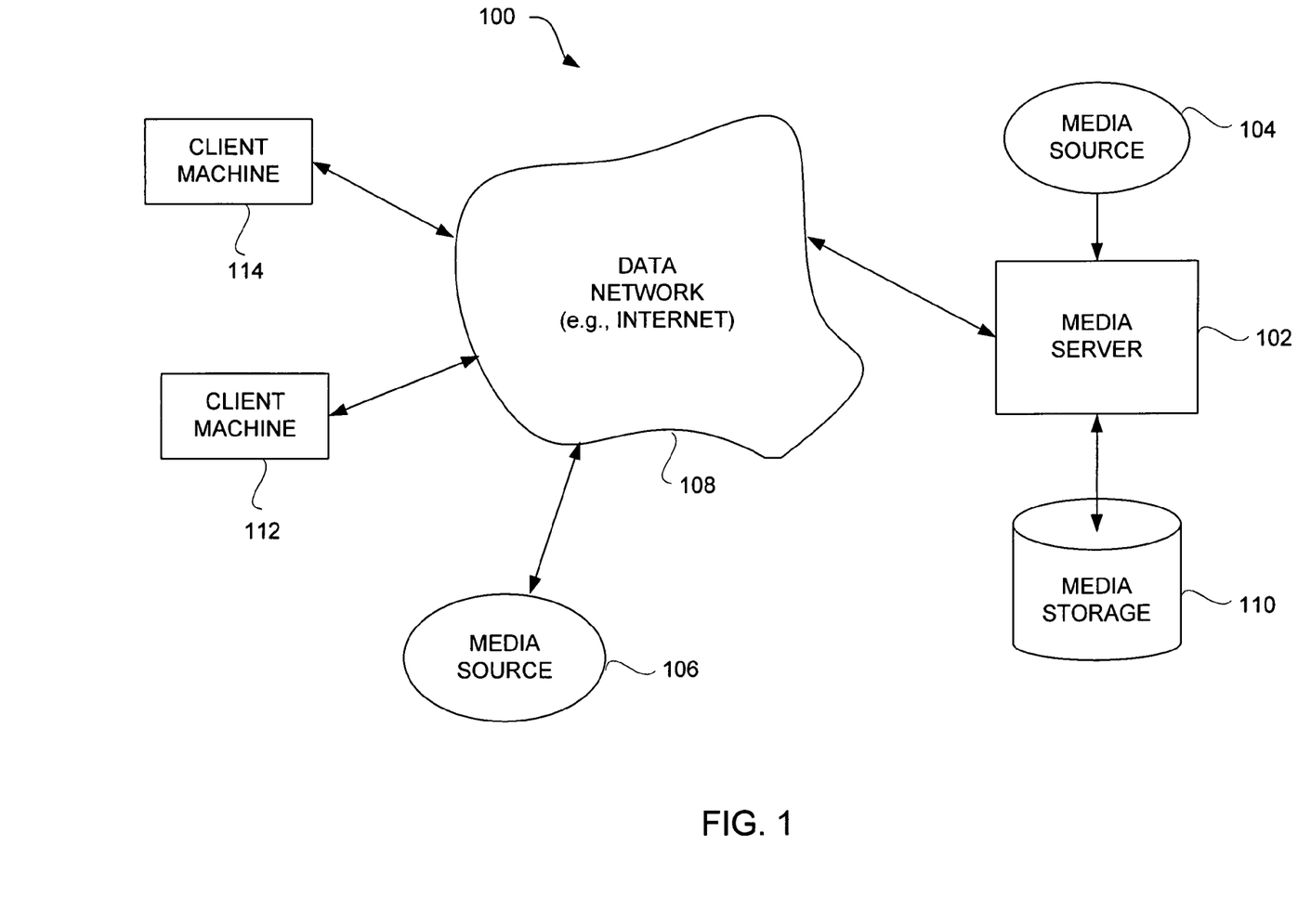
FIG. 1 is a block diagram of a media distribution system according to one embodiment of the invention.

FIG. 1 is a block diagram of a media distribution system 100 according to one embodiment of the invention. The media distribution system 100 includes a media server 102. The media server 102 stores, manages and downloads media files. The media files are provided to the media server 102 by a local media source 104 or a remote media source 106. The local media source 104 can be in the form of a compact disc (CD), a magnetic storage device, a digital versatile disk (DVD), or a disk drive. Typically, the local media source 104 is a removable medium that can be provided to a media company and delivered to the media server 102 at a hosting location. The remote media source 106 can pertain to a computing device that couples to the media server 102 through a data network 108, such as the Internet. The remote media source 106 can transmit or stream media files to the media server 102 through the data network 108. The media files that are received at the media server 102 from the media sources 104, 106 can be processed and then stored to a media storage 110. The processing of the media files at the media server 102 can secure the files using encryption and can also prepare the media files for download to prospective users (i.e., purchasers).

The media distribution system 100 allows users of client machines 112 and 114 to access the media server 102 via the data network (Internet) 108. Accordingly, users of the client machines 112 and 114 are able to interact with the media server 102. Through such interaction, users of the client machines 112 and 114 are able to browse the media files stored in the media storage 110, select media files for purchase, download the purchased media files, and subsequently play the purchased media files at their respective client machines 112 and 114. The media distribution system 100 operates to impose limitations on access to the media files through encryption processes. The media distribution system 100 also causes usage restrictions to be imposed on the purchased media files that have been downloaded.

The client machines 112 and 114 are computing devices, either general-purpose or special purpose. In recent times, computing devices have become smaller and more compact. The computing devices can also be designed for primarily stationary or portable usage. One type of portable computing device that the invention is suitable for use with are known as handheld computing devices. Handheld computing devices are sometimes more specialized computing devices than are general-purpose personal computers. For example, one type of handheld computing device is a portable (or personal) media player. Media players can also be referred to as consumer electronics products. A media player plays media, such as MP3 files, MPEG files, Advanced Audio Coding (AAC) files, compact discs or DVDs, for the benefit of a user. In one embodiment, the media player can utilize a disk drive to provide mass storage of media content that is played by the media player.

Figure 2:
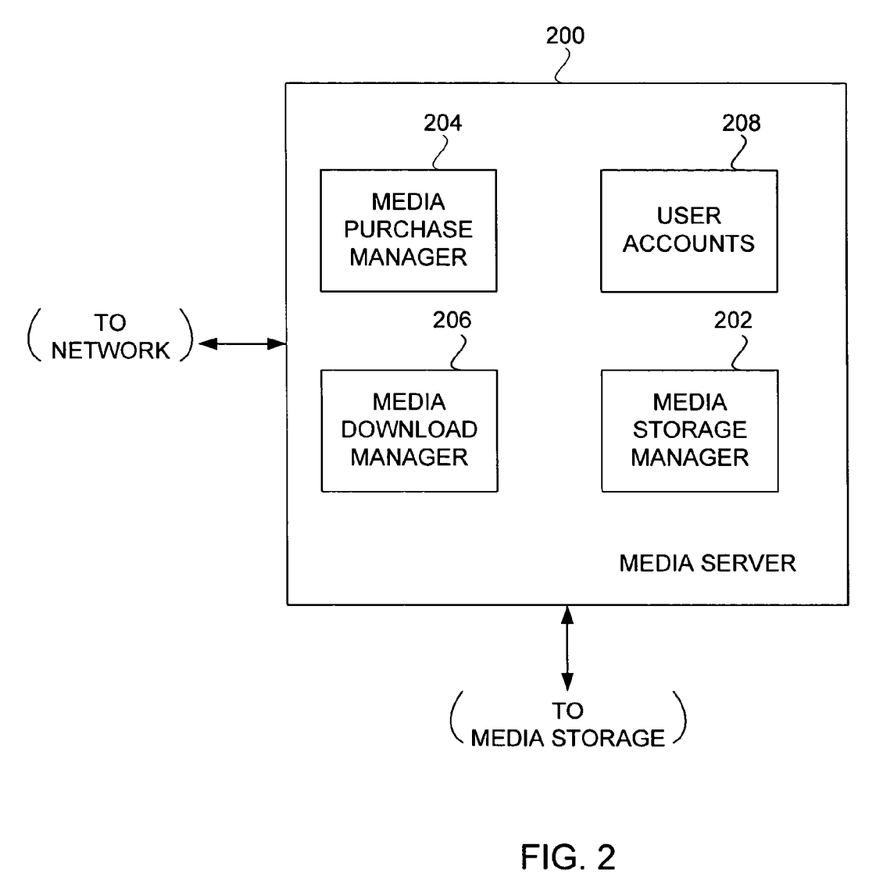
FIG. 2 is a block diagram of a media server according to one embodiment of the invention.

FIG. 2 is a block diagram of a media server 200 according to one embodiment of the invention. The media server 200 is, for example, suitable for use as the media server 102 illustrated in FIG. 1. In this regard, the media server 200 couples to a network (e.g., the data network 108) and a media storage (e.g., the media storage 110).

The media server 200 includes a media storage manager 202, a media purchase manager 204, a media download manager 206, and user accounts 208. The media storage manager 202 operates to receive incoming media files, to process the media files for eventual download, and to store the files to the media storage. The media purchase manager 204 assists users of client machines (e.g., the client machines 112 and 114 shown in FIG. 1) to purchase one or more media files through on-line interaction with the media server 200. Typically, the media purchase manager 204 would assist a user in completing an electronic commerce transaction to enable the user to purchase the right to receive and utilize one or more media files. The media download manager 206 facilitates the download of media files that have been purchased to the appropriate client machines of the users that have purchased the media files. The user accounts 208 store user information pertaining to users of the system. In one embodiment, the user information includes a set of user keys associated with each of the users. The user keys are used by the media server 200 when encrypting media files for particular users that have purchased access rights thereto. Through management of the user keys for a user, the media server 200 can limit the number or type of client machine that is able to receive or make use of the media file.

Figure 3:
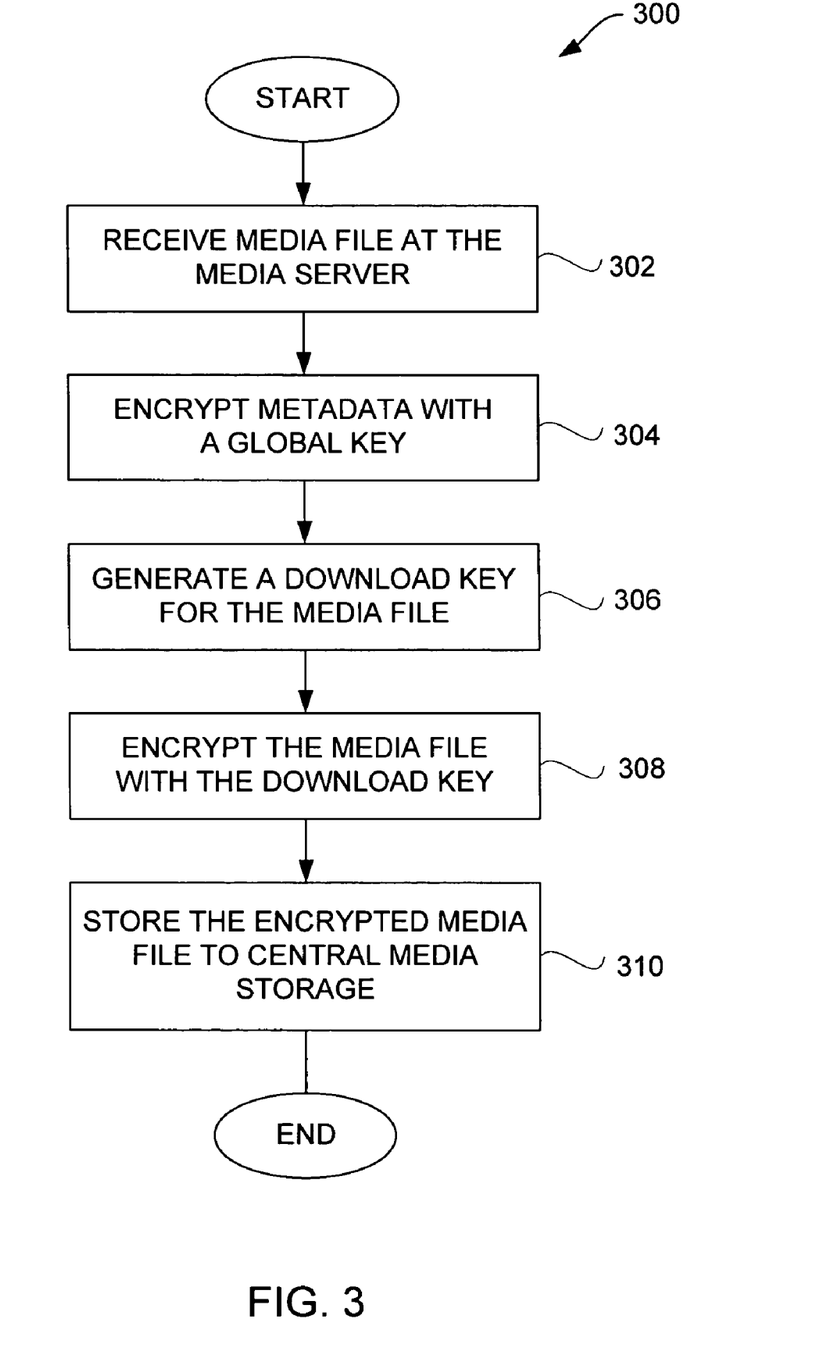
FIG. 3 is a flow diagram of media storage processing according to one embodiment of the invention.

FIG. 3 is a flow diagram of media storage processing 300 according to one embodiment of the invention. The media storage processing 300 is, for example, performed by the media server 102 illustrated in FIG. 1 or the media storage manager 202 illustrated in FIG. 2.

The media storage processing 300 initially receives 302 a media file at the media server. The media file is constructed such that it includes media data and may further include metadata. The metadata describes characteristics of the data. For example, the metadata can indicate characteristics, such as, name, artist, copyright information, title, etc. The metadata of the media file is optionally encrypted 304, such as with a global key. In one embodiment, the global key is used to encrypt the metadata for all the media files at the media server. In another embodiment, if desired, different global keys can be used with different media servers. Typically, the metadata is not that sensitive so the use of a common global key to encrypt such is adequate. However, if stronger encryption is desired, then more specialized keys can be used to increase the level of security. In another embodiment, the metadata is not encrypted.

A download key is also generated 306 for the media file. The download key is a substantially random secret key that is generated for each media file to be stored. Next, the media file is encrypted 308 with the download key. Here, the media file is encrypted 308 with the download key corresponding to that particular media file. At this point, the media file (encrypted media file) is secured through encryption and ready for download to potential users. After the media file is encrypted 308, the encrypted media file is stored 310 to a central media storage. In one embodiment, the central media storage is the media storage 110 of FIG. 1. Following the operation 310, the media storage processing 300 is complete and ends.

Once stored in the central media storage, the encrypted media file can be purchased and transmitted to the purchaser in its encrypted format to prevent unauthorized access to the media file. Hence, by storing the encrypted media files to the central media storage, the media files are stored in an encrypted manner and are ready to be downloaded with little or no further processing. Consequently, the server is able to be more efficient and handle greater demands for downloading of media files.

Figure 4A:
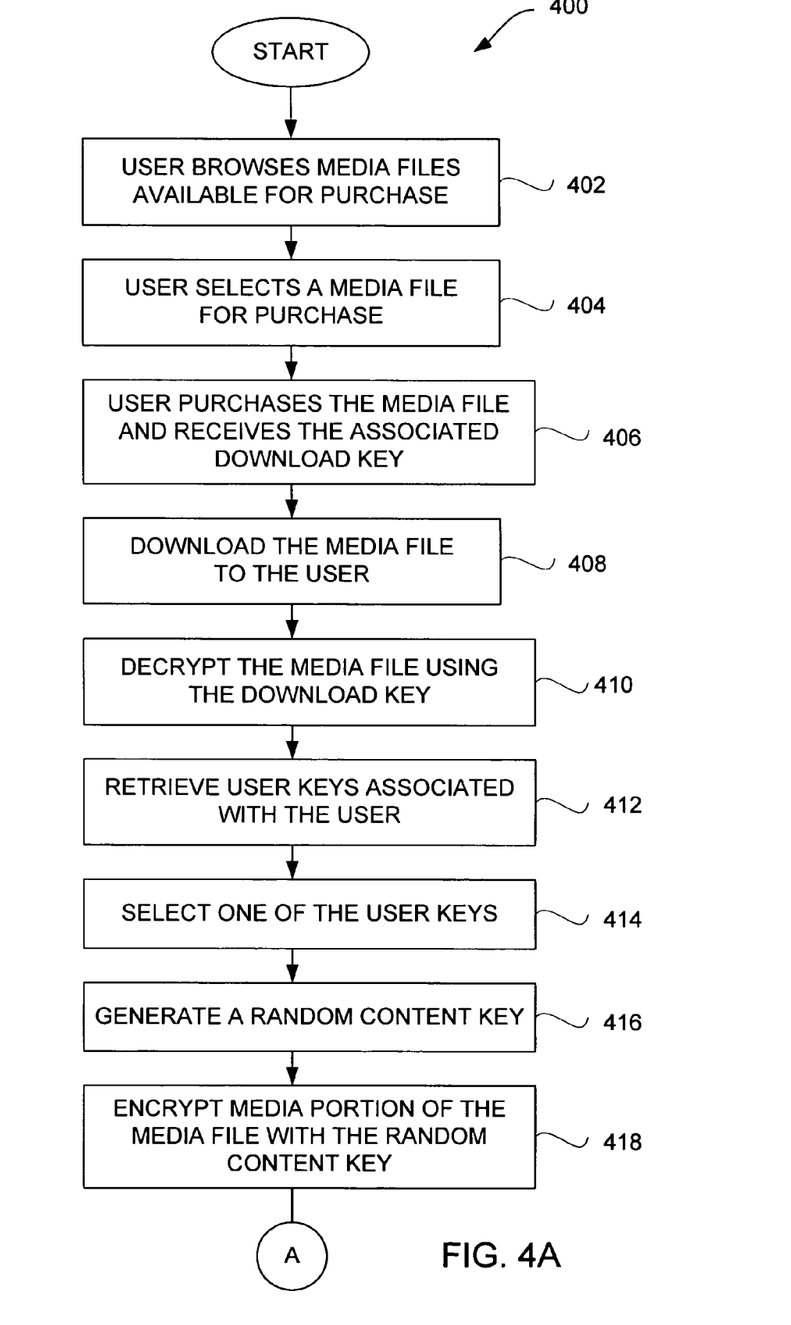
FIGS. 4A and 4B are flow diagrams of media purchase and download processing according to one embodiment of the invention.
Figure 4B:
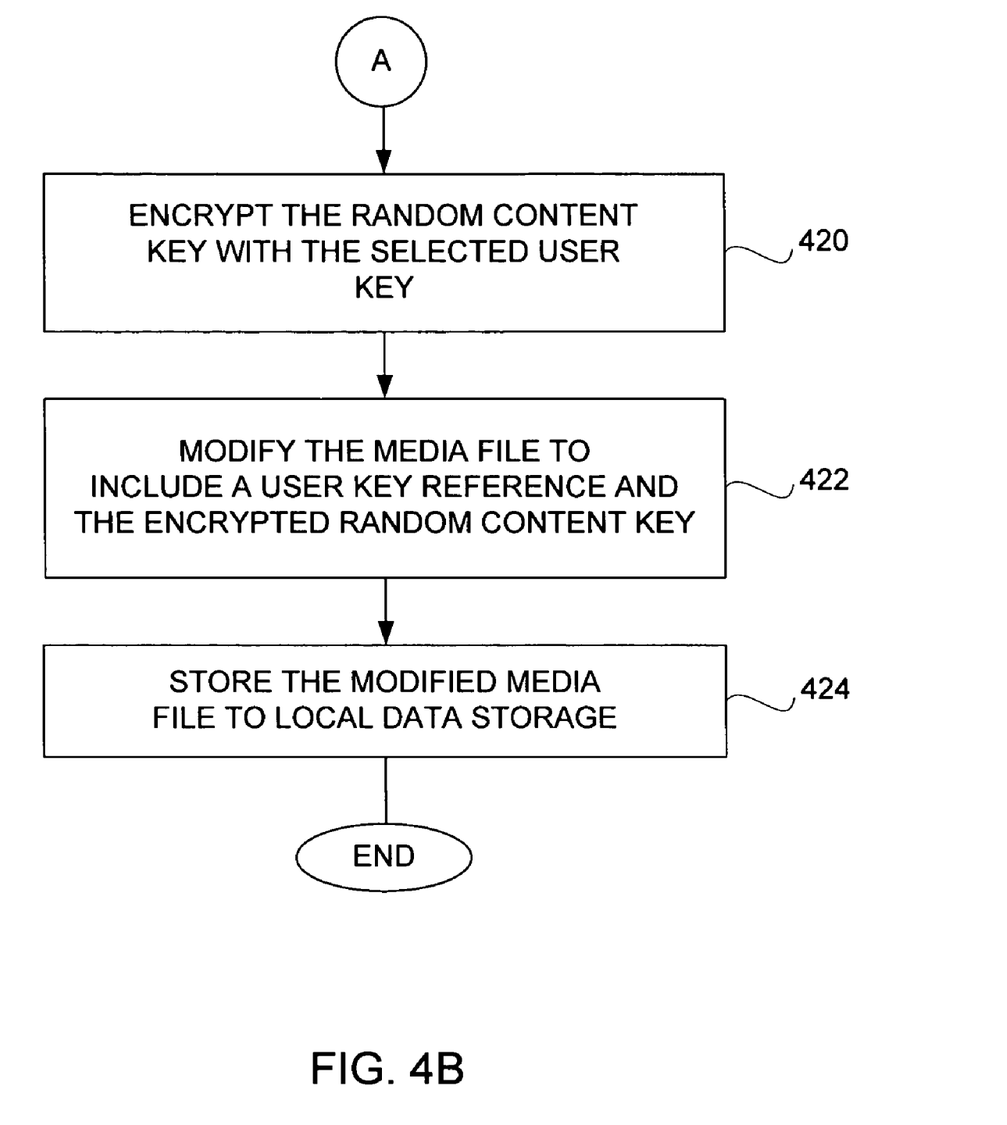

FIGS. 4A and 4B are flow diagrams of media purchase and download processing 400 according to one embodiment of the invention. The media purchase and download processing 400 is, for example, performed by the media server 102 illustrated in FIG. 1 or by the media purchase manager 204 and the media download manager 206 of the media server 200 illustrated in FIG. 2.

The media purchase and download processing 400 initially permits a user to browse 402 media files that are available for purchase. Here, the user is able to browse the media files to assist the user in determining whether to purchase one or more of the media files. Often the user is able to view at least portions of the metadata for the media files, view text associated with the media files, and/or sample audio, graphics or video pertaining to the media files.

After the browsing 402, a user selects 404 a media file for purchase. Then, the user purchases 406 the media file and receives an associated download key. The user may also receive a global key when a media file is purchased. Here, the purchase of the media file can be an electronic commerce transaction in which the user pays for the access to the media file through any of a variety of financial transfer means, such as credit card, debit card, or payment assistance (e.g., PayPal, Neteller, pre-paid ATM, etc.).

Next, the media file is downloaded 408 to the user. In one embodiment, the download 408 of the media file can be performed by streaming the media file through the data network to the user, namely, to the user's client machine. Here, the downloading 408 of the media file is efficient because the manner in which the media file is stored facilitates its immediate download without the need for processing-intensive conversion.

Once the media file is downloaded 408, the media file is then decrypted 410 at the user's local machine using the download key. Further, at this point, if the metadata of the media file itself is encrypted, the metadata can also be decrypted using the global key which has previously been provided to the user who has purchased the access rights to the media file.

Following the purchase 406 of the media item, user keys associated with the user are retrieved 412. One of the user keys is selected 414. The user keys can be rotated (e.g., cycled) for improved security. In one embodiment, the number of different client machines that can be authorized can be limited, thereby restricting the ability of the user to utilize the downloaded media file on more than the predetermined limited number of client machines.

After the user has selected 414 one of the user keys, a random content key is generated 416. The random content key is a key that is substantially randomly generated or pseudo-randomly generated. Then, the media portion of the media file is encrypted 418 with the random content key. The random content key is then itself encrypted 420 with the selected user key.

Next, the media file is modified 422 to further include a user key reference and the encrypted random content key. Optionally, the media file could be further modified to include information identifying the user who purchased access rights to the media file. For example, the media file could be modified to include user-identifying information by storing an encrypted version of the global key (associated with the user that purchased the access rights) into the media file. Optionally, the media portion of the media file may be modified by digitally watermarking it with user-identifiable information.

In order to utilize the media file on the client machine, the appropriate user key will be needed, and the user key reference allows the user key to be located (should it be present). In one embodiment, if the user key is present, the user key is stored in a local data storage of the user's client machine. Likewise, the modified media file is stored 424 to the local data storage. For example, the local data storage can be a disk drive, random-access memory, a removable media, etc. Also, in one embodiment, a database can be used to manage the storage of the modified media files in the local data storage. Following the operation 424, the media purchase and download processing 400 is complete and ends.

The media file, whether encrypted or not, can have a file format that varies. For example, one suitable file format is a MPEG4 format. Other suitable formats include QuickTime movies, MPEG-1 format and MPEG-2 format.

Figure 5A:
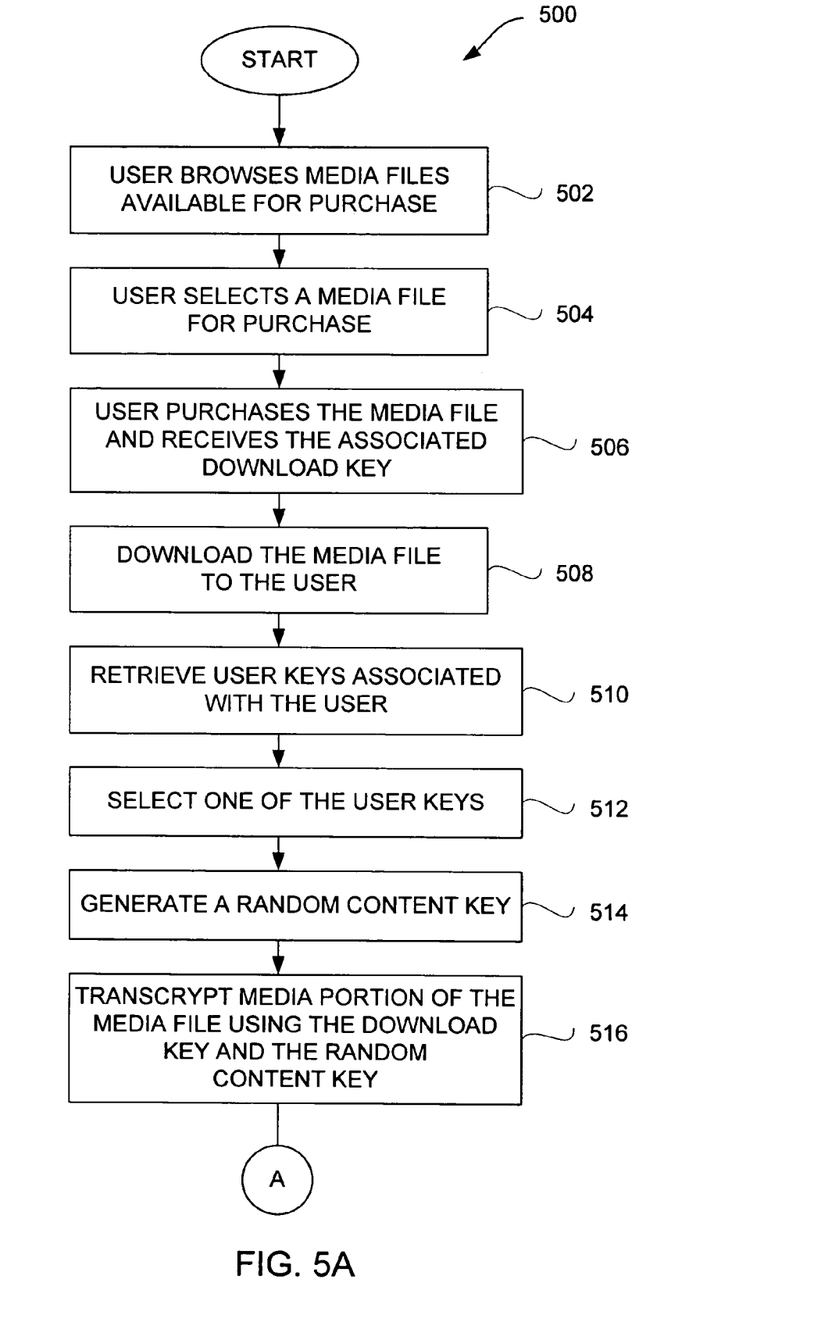
FIGS. 5A and 5B are flow diagrams of media purchase and download processing according to another embodiment of the invention.
Figure 5B:
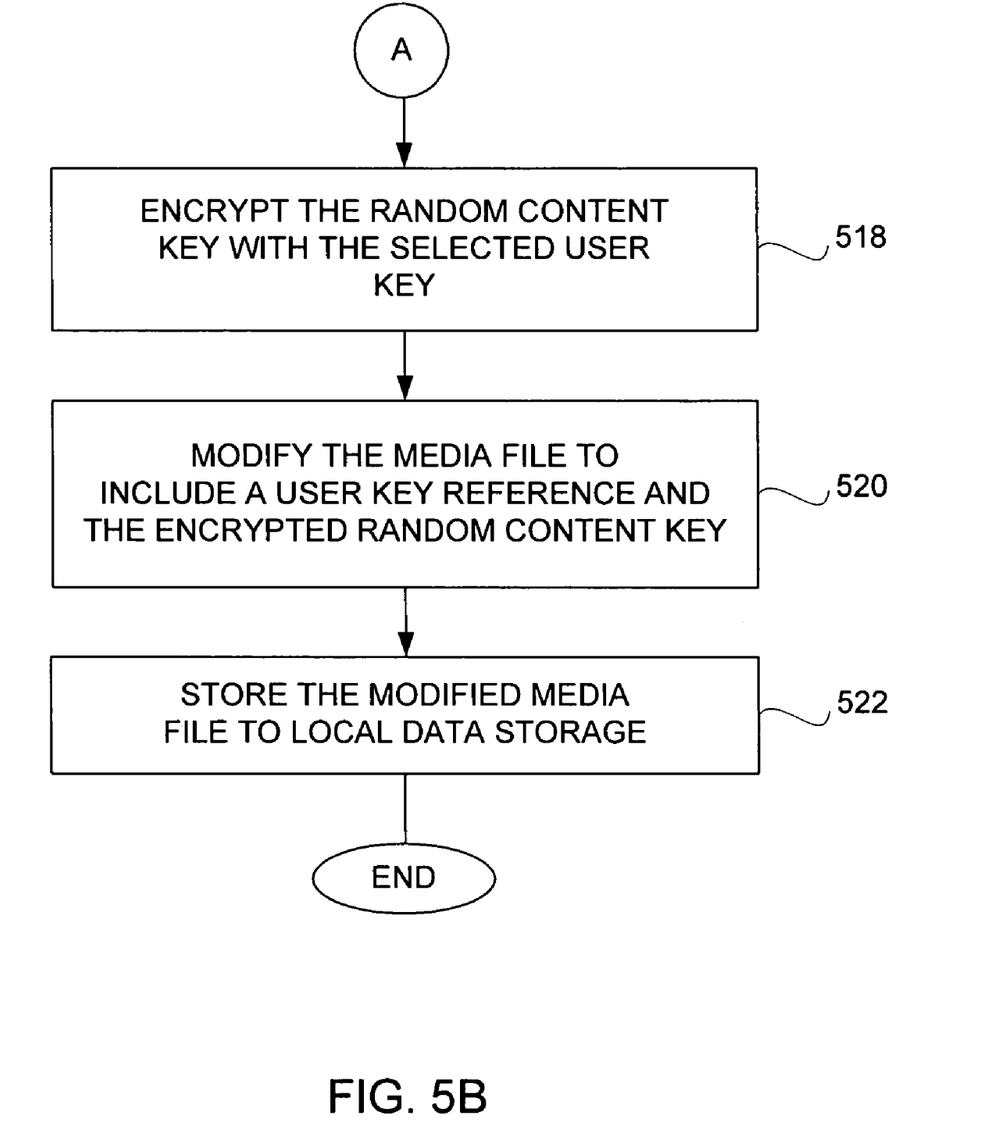

FIGS. 5A and 5B are flow diagrams of media purchase and download processing 500 according to another embodiment of the invention. The media purchase and download processing 500 is, for example, performed by the media server 102 illustrated in FIG. 1 or by the media purchase manager 204 and the media download manager 206 of the media server 200 illustrated in FIG. 2.

The media purchase and download processing 500 initially permits a user to browse 502 media files that are available for purchase. Here, the user is able to browse the media files to assist the user in determining whether to purchase one or more of the media files. Often the user is able to view at least portions of the metadata for the media files, view text associated with the media files, and/or sample audio, graphics or video pertaining to the media files.

After the browsing 502, a user selects 504 a media file for purchase. Then, the user purchases 506 the media file and receives an associated download key. The user may also receive a global key when a media file is purchased. Here, the purchase of the media file can be an electronic commerce transaction in which the user pays for the access to the media file through any of a variety of financial transfer means, such as credit card, debit card, or payment assistance (e.g., PayPal, Neteller, pre-paid ATM, etc.).

Next, the media file is downloaded 508 to the user. In one embodiment, the download 508 of the media file can be performed by streaming the media file through the data network to the user, namely, to the user's client machine. Here, the downloading 508 of the media file is efficient because the manner in which the media file is stored facilitates its immediate download without the need for processing-intensive conversion.

Following the purchase 506 of the media item, user keys associated with the user are retrieved 510. Then, one of the user keys is selected 512. The user keys can be rotated (e.g., cycled) for improved security. In one embodiment, the number of different client machines that can be authorized can be limited, thereby restricting the ability of the user to utilize the downloaded media file on more than the predetermined limited number of client machines.

After the user has selected 512 one of the user keys, a random content key is generated 514. The random content key is a key that is substantially randomly generated or pseudo-randomly generated. Then, the media portion of the media file is transcrypted 516 using the download key and the random content key. The random content key is then itself encrypted 518 with the selected user key.

Next, the media file is modified 520 to further include a user key reference and the encrypted random content key. Optionally, the media file could be further modified to include information identifying the user who purchased access rights to the media file. For example, the media file could be modified to include user-identifying information by storing an encrypted version of the global key (associated with the user that purchased the access rights) into the media file.

In order to utilize the media file on the client machine, the appropriate user key will be needed, and the user key reference allows the user key to be located (should it be present).

In one embodiment, if the user key is present, the user key is stored in a local data storage of the user's client machine. Likewise, the modified media file is stored 522 to the local data storage. For example, the local data storage can be a disk drive, random-access memory, a removable media, etc. Also, in one embodiment, a database can be used to manage the storage of the modified media files in the local data storage. Following the operation 522, the media purchase and download processing 500 is complete and ends.

Figure 6A:
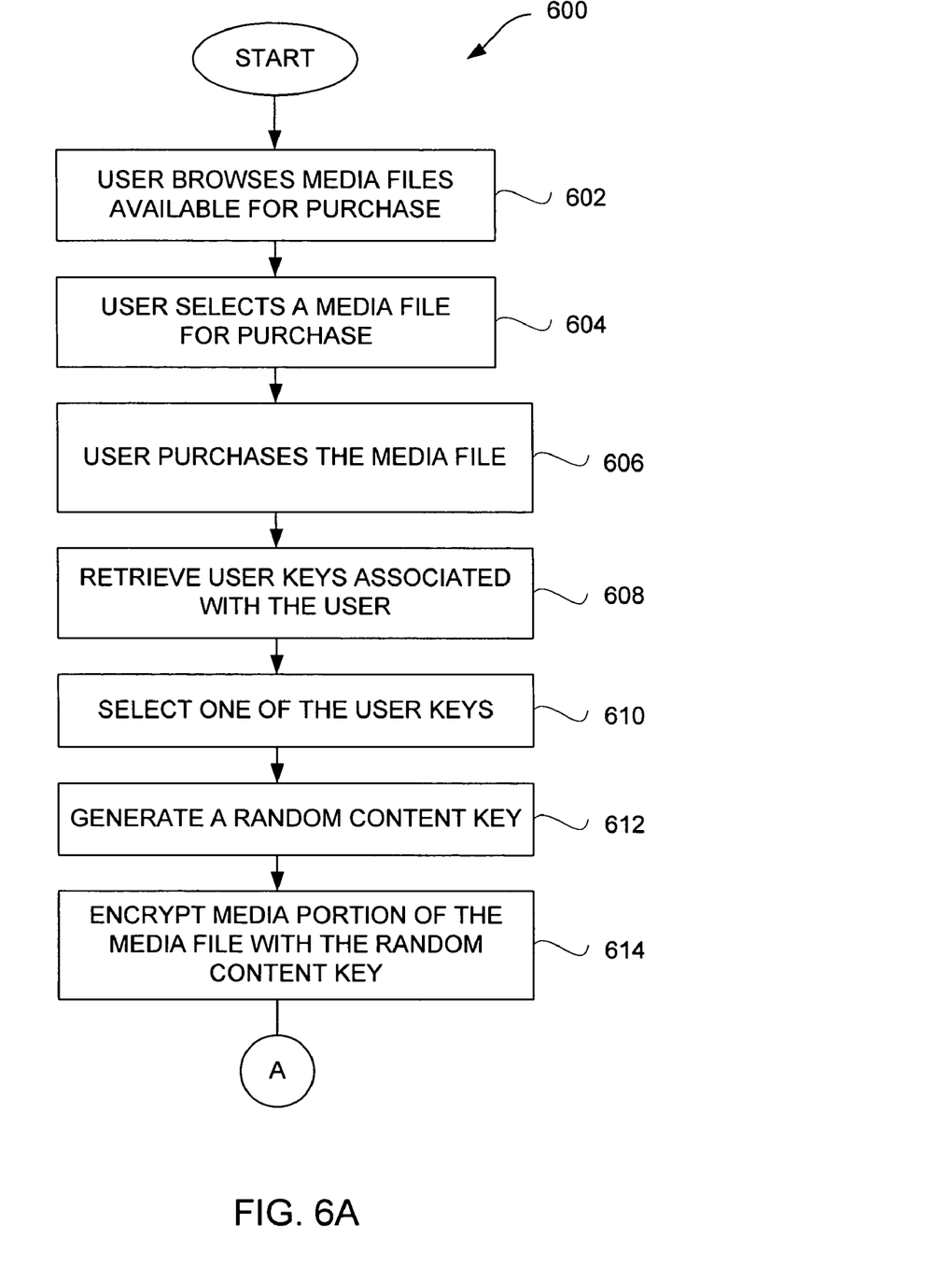
FIGS. 6A and 6B are flow diagrams of media purchase and download processing according to still another embodiment of the invention.
Figure 6B:
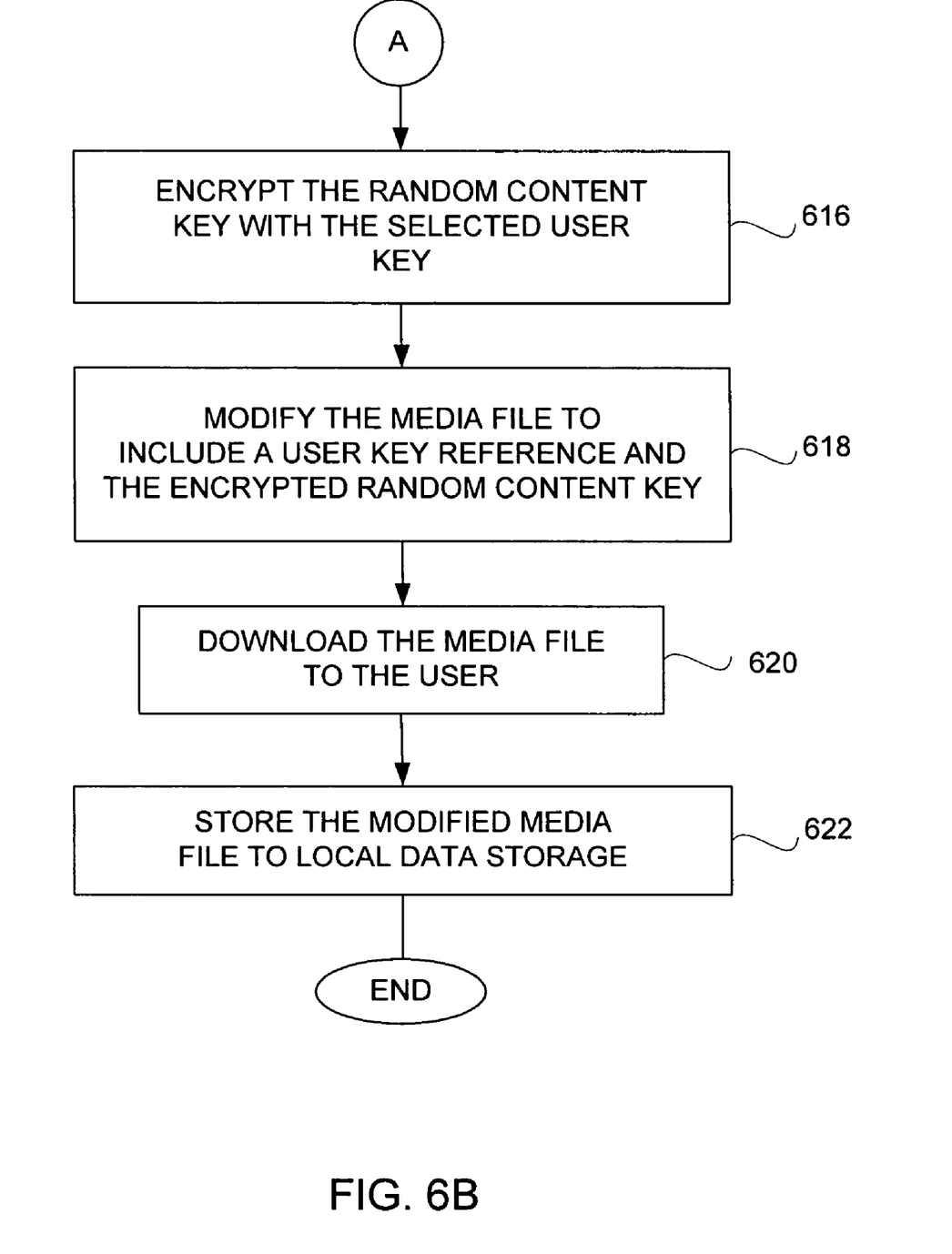

FIGS. 6A and 6B are flow diagrams of media purchase and download processing 600 according to still another embodiment of the invention. The media purchase and download processing 600 is, for example, performed by the media server 102 illustrated in FIG. 1 or by the media purchase manager 204 and the media download manager 206 of the media server 200 illustrated in FIG. 2.

The media purchase and download processing 600 initially permits a user to browse 602 media files that are available for purchase. Here, the user is able to browse the media files to assist the user in determining whether to purchase one or more of the media files. Often the user is able to view at least portions of the metadata for the media files, view text associated with the media files, and/or sample audio, graphics or video pertaining to the media files.

After the browsing 602, a user selects 604 a media file for purchase. Then, the user purchases 606 the media file. Here, the purchase of the media file can be an electronic commerce transaction in which the user pays for the access to the media file through any of a variety of financial transfer means, such as credit card, debit card, or payment assistance (e.g., PayPal, Neteller, pre-paid ATM, etc.).

Following the purchase 606 of the media item, user keys associated with the user are retrieved 608. Then, one of the user keys is selected 610. The user keys can be rotated (e.g., cycled) for improved security. In one embodiment, the number of different client machines that can be authorized can be limited, thereby restricting the ability of the user to utilize the downloaded media file on more than the predetermined limited number of client machines.

After the user has selected 610 one of the user keys, a random content key is generated 612. The random content key is a key that is substantially randomly generated or pseudo-randomly generated. Then, the media portion of the media file is encrypted 614 with the random content key. The random content key is then itself encrypted 616 with the selected user key.

Next, the media file is modified 618 to further include a user key reference and the encrypted random content key. Optionally, the media file could be further modified to include information identifying the user who purchased access rights to the media file. For example, the media file could be modified to include user-identifying information by storing an encrypted version of the global key (associated with the user that purchased the access rights) into the media file. Optionally, the media portion of the media file may be modified by digitally watermarking it with user-identifiable information.

The media file is then downloaded 620 to the user. In one embodiment, the download 620 of the media file can be performed by streaming the media file through the data network to the user, namely, to the user's client machine.

In order to utilize the media file on the client machine, the appropriate user key is needed, and the user key reference allows the user key to be located (should it be present). In one embodiment, if the user key is present, the user key is stored in a local data storage of the user's client machine. Likewise, the modified media file is stored 622 to the local data storage. For example, the local data storage can be a disk drive, random-access memory, a removable media, etc. Also, in one embodiment, a database can be used to manage the storage of the modified media files in the local data storage. Following the operation 622, the media purchase and download processing 600 is complete and ends.

Figure 7:
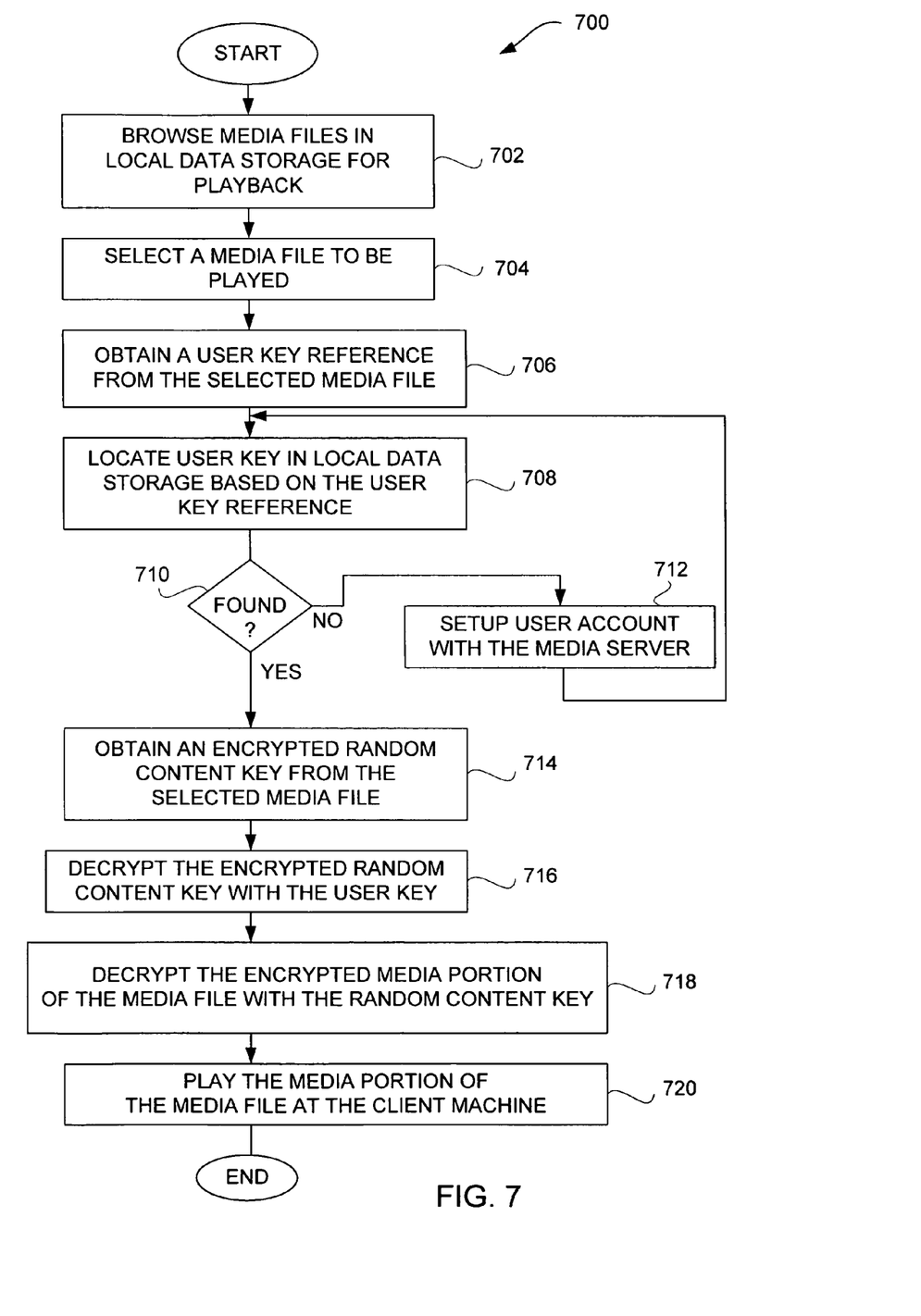
FIG. 7 is a flow diagram of playback processing according to one embodiment of the invention.

FIG. 7 is a flow diagram of playback processing 700 according to one embodiment of the invention. The playback processing 700 is performed at a client machine (user machine), such as the client machine 112 or the client machine 114 illustrated in FIG. 1. The client machines can be desktop computers, notebook computers, handheld computers, personal digital assistants, media players, and various other devices.

The playback processing 700 allows a user of a client machine to browse 702 media files in the local data storage for playback. In other words, the media files that are available for playback can be searched, scanned or reviewed (e.g., previewed) by the user. Typically, the user browses through the media files using the metadata for the media files or perhaps samples of the media files. Next, a media file to be played is selected 704. Then, a user key reference is obtained 706 from the selected media file. As previously noted, the media files that are stored to the local media storage have a user key reference contained within the media files. Hence, the user key reference can be obtained 706 from the selected media file. A user key is then located 708 in the client machine (e.g., local data storage) based on the user key reference that was obtained 706 from the selected media file.

Next, a decision 710 determines whether the user key was found. When the decision 710 determines that the user key is not able to be found, then the user has not configured the client machine to be suitable for accessing media files; hence, a user account must be setup 712 with the media server. This requires that the user interact with the media server via the client machine to setup a user account specific to the client machine. Following the setup 712 of the user account, the playback processing 700 returns to repeat the operation 708 and subsequent operations so that the user key can be located.

On the other hand, when the decision 710 determines that the user key has been found, an encrypted random content key is obtained 714 from the selected media file. Again, the nature of the selected media file is such that it contains the encrypted random content key. Then, the encrypted random content key is decrypted 716 with the user key. The random content key that results from the decrypting 716 can then be used to decrypt 718 the encrypted media portion of the media file. At this point, the media portion of the media file is in the "clear." Finally, the media portion of the media file is played 720 at the client machine. Following the operation 720, the playback processing 700 is complete and ends.

The various aspects, features, embodiments or implementations of the invention described above can be used alone or in various combinations.

The media files can pertain to audio items (e.g., audio files or songs, such as for music), video items (e.g., video files or movies), or image items (e.g., photos).

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may, but need not, yield one or more of the following advantages. One advantage of the invention is that encryption and user accounts are used to provide controlled distribution of content. The controlled distribution can not only restrict unauthorized access to the content but also limit usage rights to the content by authorized users. Another advantage of the invention is that media file-specific encryption can be utilized at a server-side, while user-specific encryption can be used at a client-side. Another advantage of the invention is that media files can be commonly encrypted at the server-side for storage and download to any user that has been authorized (e.g., by purchasing such rights). Another advantage of the invention is that media files can be re-encrypted at a client-side using a random criteria so that all media files at the client-side are encrypted with a different key. Still another advantage of the invention is that, if desired, purchased media files can have restricted usage rights such that the content within the media files can only be played on a limited number of clients (user machines). Yet another advantage of the invention is that media files at a client-side can be browsed with respect to metadata (which is stored unencrypted) while access to media content data is protected through encryption.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for acquiring a media file for usage at a local machine from a central server machine, said method comprising:

identifying a media file from a plurality of available media files, each of the media files having at least media content data;

purchasing access to the identified media file;

obtaining a download key that corresponds to the identified media file;

downloading the identified media file in its encrypted form to the local machine;

decrypting the identified media file to its unencrypted form using the download key;

obtaining at least one user key, the user key being associated with a user of the local machine;

generating a content key that is at least substantially random;

encrypting the media content data of the identified media file with the content key;

encrypting the content key with the user key to produce an encrypted content key;

modifying the identified media file to further include a user key reference and the encrypted content key; and storing the modified media file to the local machine.

2. A method as recited in claim 1, wherein a plurality of media files are stored on the central server machine, each of the media files having at least metadata and media content data, the metadata describing characteristics of the associated media item.

3. A method as recited in claim 2, wherein said identifying (a) comprises:
(a1) browsing the media files stored on the server machine through use of the metadata for the media files; and
(a2) identifying one of the media files to be the identified media file.

4. A method as recited in claim 3, wherein said identifying of the one of the media files is performed by a user.

5. A method as recited in claim 1, wherein said storing operates to store the modified media file to a local storage associated with the local machine.

6. A method as recited in claim 5, wherein the local storage is a data storage device within the local machine.

7. A method as recited in claim 1, wherein the local machine connects to the central server machine over a network, and wherein the network comprises the Internet.

8. A method as recited in claim 1, wherein the central server machine stores an account for each of the users, each account having at least one user key assigned thereto, and
wherein the user key obtained by said obtaining is the at least one user key assigned to the account corresponding to the user.

9. A method as recited in claim 8, wherein the local machine associated with the user stores at least one user key assigned to the account corresponding to the user, and wherein said obtaining of the user key operates to obtain the user key from the local machine.

10. A method for acquiring a media file for usage at a local machine from a central server machine, said method comprising:
identifying a media file from a plurality of available media files, each of the media files having at least media content data;
purchasing access to the identified media file;
obtaining a download key that corresponds to the identified media file;
downloading the identified media file in its encrypted form to the local machine;
obtaining at least one user key, the user key being associated with a user of the local machine;
generating a content key that is at least substantially random;
transcrypting the media content data of the identified media file using the download key and the content key;
encrypting the content key with the user key to produce an encrypted content key;
modifying the identified media file to further include a user key reference and the encrypted content key; and
storing the modified media file to the local machine.

11. A method as recited in claim 10, wherein a plurality of media files are stored on the central server machine, each of the media files having at least metadata and media content data, the metadata describing characteristics of the associated media item.

12. A method as recited in claim 11, wherein said identifying (a) comprises:
(a1) browsing the media files stored on the server machine through use of the metadata for the media files; and
(a2) identifying one of the media files to be the identified media file.

13. A method as recited in claim 12, wherein said identifying of the one of the media files is performed by a user.

14. A method as recited in claim 10, wherein said storing operates to store the modified media file to a local storage associated with the local machine.

15. A method as recited in claim 10, wherein the local machine connects to the central server machine over a network, and wherein the network comprises the Internet.

16. A method as recited in claim 10, wherein the central server machine stores an account for each of the users, each account having at least one user key assigned thereto, and
wherein the user key obtained by said obtaining is the at least one user key assigned to the account corresponding to the user.

17. A method as recited in claim 16, wherein the local machine associated with the user stores at least one user key assigned to the account corresponding to the user, and wherein said obtaining of the user key operates to obtain the user key from the local machine.

18. A method for acquiring a media file for usage at a local machine from a central server machine, said method comprising:
identifying a media file from a plurality of available media files, each of the media files having at least media content data;
purchasing access to the identified media file;
obtaining at least one user key, the user key being associated with a user of the local machine;
generating a content key that is at least substantially random;
encrypting the media content data of the identified media file with the content key;
encrypting the content key with the user key to produce an encrypted content key; and
modifying the identified media file to further include a user key reference and the encrypted content key.

19. A method as recited in claim 18, wherein said method further comprises:
subsequently downloading the identified media file in its encrypted form to the local machine; and
storing the modified media file to the local machine.

20. A method as recited in claim 19, wherein a plurality of media files are stored on the central server machine, each of the media files having at least metadata and media content data, the metadata describing characteristics of the associated media item.

21. A method as recited in claim 20, wherein said identifying (a) comprises:
(a1) browsing the media files stored on the server machine through use of the metadata for the media files; and
(a2) identifying one of the media files to be the identified media file.

22. A method as recited in claim 21, wherein said identifying of the one of the media files is performed by a user.

23. A method as recited in claim 19, wherein said storing operates to store the modified media file to a local storage associated with the local machine.

24. A method as recited in claim 23, wherein the local storage is a data storage device within the local machine.

25. A method as recited in claim 19, wherein the local machine connects to the central server machine over a network, and wherein the network comprises the Internet.

26. A method as recited in claim 19, wherein the central server machine stores an account for each of the users, each account having at least one user key assigned thereto, and
wherein the user key obtained by said obtaining is the at least one user key assigned to the account corresponding to the user.

27. A method as recited in claim 26, wherein the local machine associated with the user stores at least one user key assigned to the account corresponding to the user, and wherein said obtaining of the user key operates to obtain the user key from the local machine.

28. A non-transitory computer readable medium including at least computer program code for acquiring a media file for usage at a local machine from a central server machine, said non-transitory computer readable medium comprising:
- computer program code for receiving a particular media file at the local machine from the server machine, the particular media file having at least media content data;
- computer program code for decrypting the particular media file to its unencrypted form using the download key;
- computer program code for obtaining at least one user key, the user key being associated with a user of the local machine;
- computer program code for generating a content key that is at least substantially random;
- computer program code for encrypting the media content data of the particular media file with the content key;
- computer program code for encrypting the content key with the user key to produce an encrypted content key;
- computer program code for modifying the particular media file to further include a user key reference and the encrypted content key; and
- computer program code for storing the modified media file to the local machine.

29. A non-transitory computer readable medium as recited in claim 28, wherein said non-transitory computer readable medium further comprises:
- computer program code for identifying a media file to be presented, the identified media file having at least encrypted media content data, a user key reference, and an encrypted content key;
- computer program code for obtaining a user key based on the user key reference within the identified media file;
- computer program code for obtaining the encrypted content key from the identified media file;
- computer program code for decrypting the encrypted content key using the user key to obtain the content key;
- computer program code for decrypting the encrypted media content data of the identified media file with the content key; and
- computer program code for presenting the media content data of the identified media file.

30. A non-transitory computer readable medium as recited in claim 29,
- wherein each of the media files has at least the media content data and the metadata, the metadata describing characteristics of the associated media item;
- wherein the identified media file is stored on a local machine, and
- wherein said computer program code for presenting presents the media content data of the identified media file at the local machine.

31. A non-transitory computer readable medium including at least computer program code for usage of a media file at a local machine from a central server machine, said non-transitory computer readable medium comprising:
- computer program code for identifying a media file from a plurality of available media files, each of the media files having at least media content data;
- computer program code for purchasing access to the identified media file;
- computer program code for obtaining a download key that corresponds to the identified media file;
- computer program code for downloading the identified media file in its encrypted form to the local machine;
- computer program code for obtaining at least one user key, the user key being associated with a user of the local machine;
- computer program code for generating a content key that is at least substantially random;
- computer program code for transcrypting the media content data of the identified media file using the download key and the content key;
- computer program code for encrypting the content key with the user key to produce an encrypted content key;
- computer program code for modifying the identified media file to further include a user key reference and the encrypted content key; and
- computer program code for storing the modified media file to the local machine.

32. A non-transitory computer readable medium including at least computer program code for acquiring a media file for usage at a local machine from a central server machine, said non-transitory computer readable medium comprising:
- computer program code for identifying a media file from a plurality of available media files, each of the media files having at least media content data;
- computer program code for purchasing access to the identified media file;
- computer program code for obtaining at least one user key, the user key being associated with a user of the local machine;
- computer program code for generating a content key that is at least substantially random;
- computer program code for encrypting the media content data of the identified media file with the content key;
- computer program code for encrypting the content key with the user key to produce an encrypted content key; and
- computer program code for modifying the identified media file to further include a user reference and the encrypted content key.

* * * * *